Apr. 3, 1923.

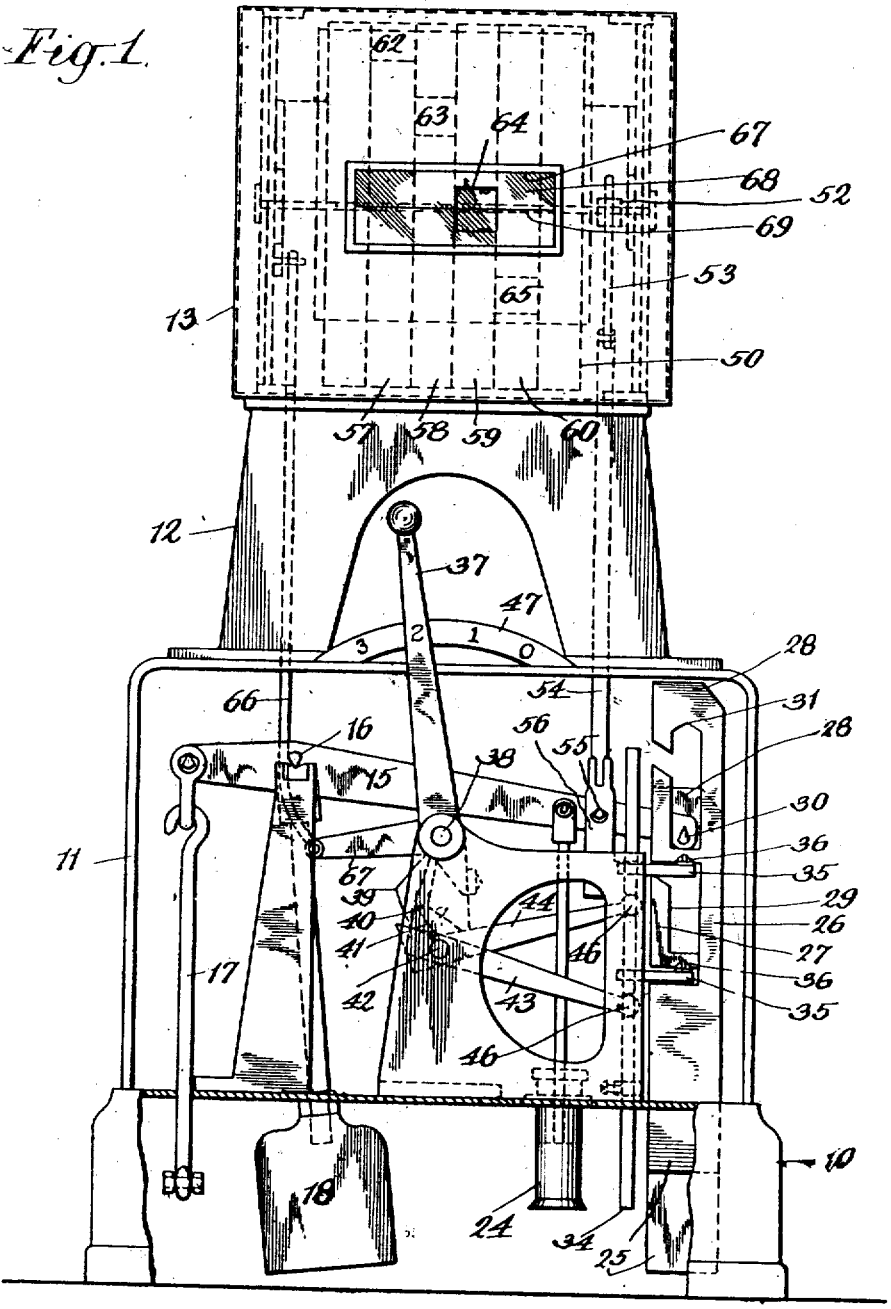

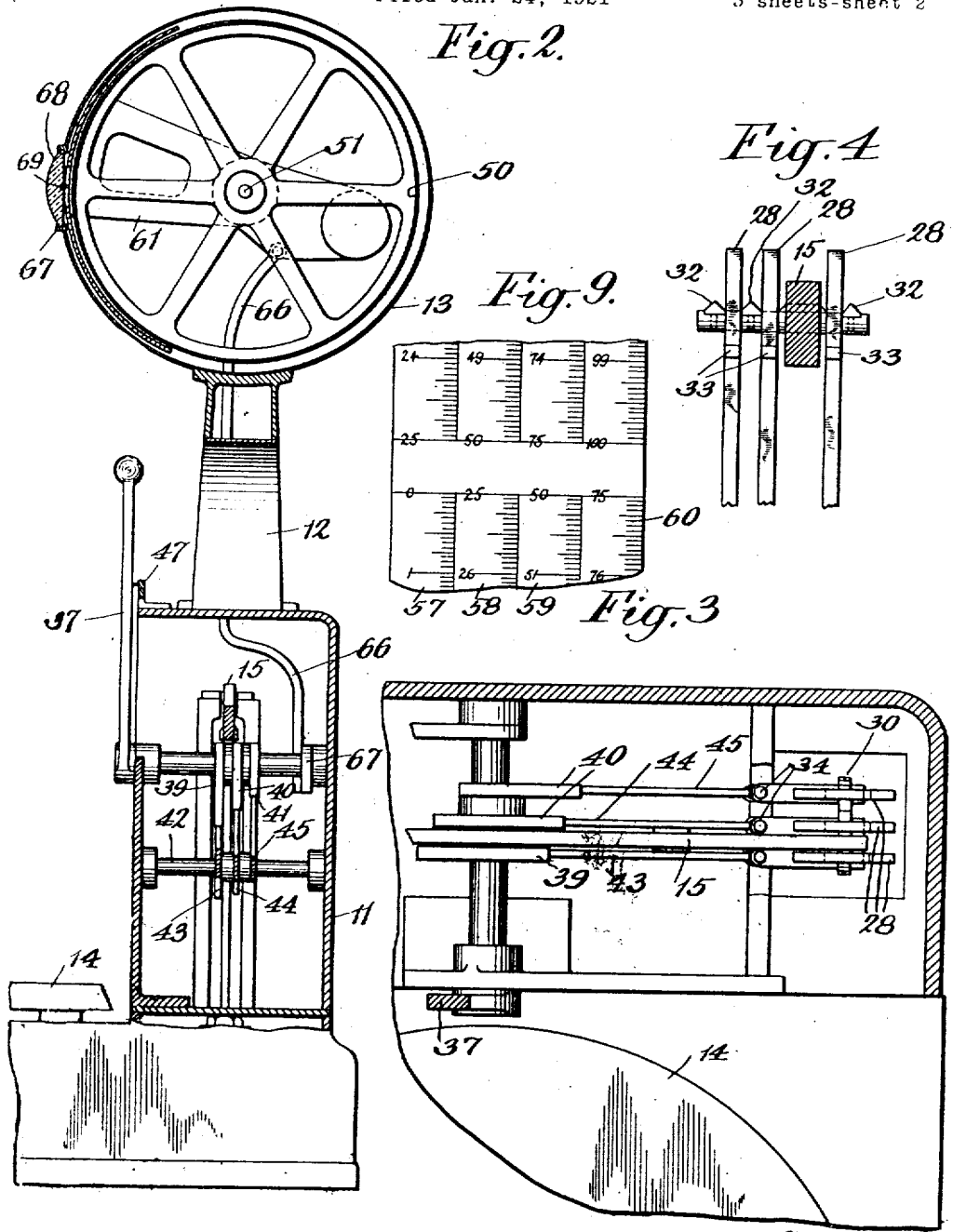

R. GRAIG

SCALE

Filed Jan. 24, 1921    3 sheets-sheet 3

1,450,487

Inventor
Robert Craig
By his Attorneys
Kerr Page Cooper & Hayward

Patented Apr. 3, 1923.

1,450,487

UNITED STATES PATENT OFFICE.

ROBERT CRAIG, OF DAYTON, OHIO, ASSIGNOR TO INTERNATIONAL SCALE COMPANY, OF DAYTON, OHIO, A CORPORATION OF ILLINOIS.

SCALE.

Application filed January 24, 1921. Serial No. 439,334.

*To all whom it may concern:*

Be it known that I, ROBERT CRAIG, a citizen of the United States of America, residing at Dayton, in the county of Montgomery and State of Ohio, have invented certain new and useful Improvements in Scales, of which the following is a full, clear, and exact description.

This invention relates to an improved weighing scale and is more particularly directed to that class of scale known to the trade as a bench, market, or portable scale. With scales of this general class it is desirable that the construction employed include characteristics of so-called counter scales and also certain features of so-called heavy capacity factory scales.

The present invention has for its objects the provision of an automatic scale which is adapted to weigh in the usual manner to indicate at a single point the entire amount of the load. Readings are always right side up and it is not necessary to glance around a large dial circle for the amount. The reading being always taken at the same point permits the use of a magnifying lens such as used in counter scales. Furthermore the reading point may be located at any point either at the front top, side, or at an angle, as desired.

Another object of the invention resides in the provision of construction in which the weight indications are read from a drum indicator and in which capacity weight devices are employed to increase the capacity of the scale. These capacity weight devices are also arranged to change the reading upon the drum so as to take into account the value or values of the applied capacity weights.

With this construction a combined reading at a single point may be taken of the sum of the automatically counterbalanced load and of the load counterbalanced by the capacity weight or weights. In this manner mental additions of two readings are avoided.

Another object of the invention resides in the provision of a construction in which the weight indicating charts may be made of ample length to give an increased clear interval between the successive graduation lines over constructions now employed for this type of scale.

Other objects and advantages will be pointed out in the accompanying specification and shown in the drawings in which:

Fig. 1 shows a front elevational view of one embodiment of the invention. The front cover plate is shown removed to show the interior parts and the tare beam is likewise omitted.

Fig. 2 is a vertical sectional view of the scale shown in Fig. 1.

Fig. 3 is a horizontal detail sectional view of the parts shown in Fig. 2.

Fig. 4 is a detail view showing the multiple drop weights supported by an aligning knife edge on the beam.

Fig. 9 shows a section of the weight chart.

Figure 6:
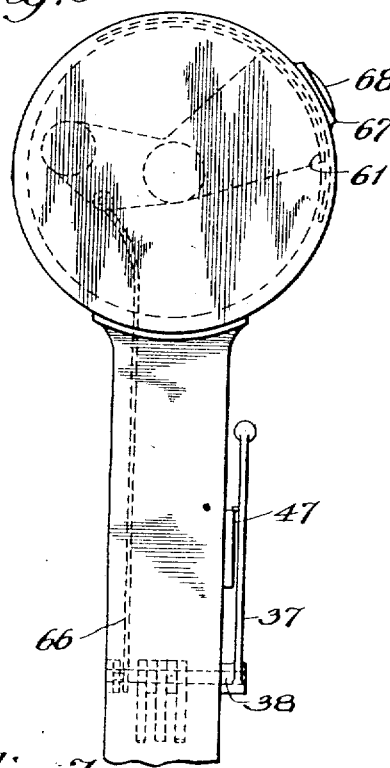
Fig. 6 shows an end view of the construction shown in Fig. 5 and also shows the angle location of the reading opening which feature may be incorporated in the preferred embodiment.

In more detail the scale comprises a base 10 of usual construction having at the rear thereof a housing 11 for the counterbalancing mechanism and scale beam. On top of the housing 11 is a short pedestal 12 which carries a drum housing 13. Within the base 10 there is the usual base lever system (not shown) and these levers suitably support the platform or goods support 14 (Fig. 2). 15 represents the scale beam. This beam is fulcrumed by means of knife edges 16 which are supported in suitable bearings carried by the brackets best shown in Fig. 1. The scale beam is connected to the base lever system by means of a steelyard 17 and a suitable loop and knife edges. The beam also carries a depending pendulum 18 which preferably swings in the base section of the scale, suitable slots being provided in the base top to permit the travel of the pendulum. The pendulum 18 constitutes an automatic counterbalance for the applied load.

Figure 5:
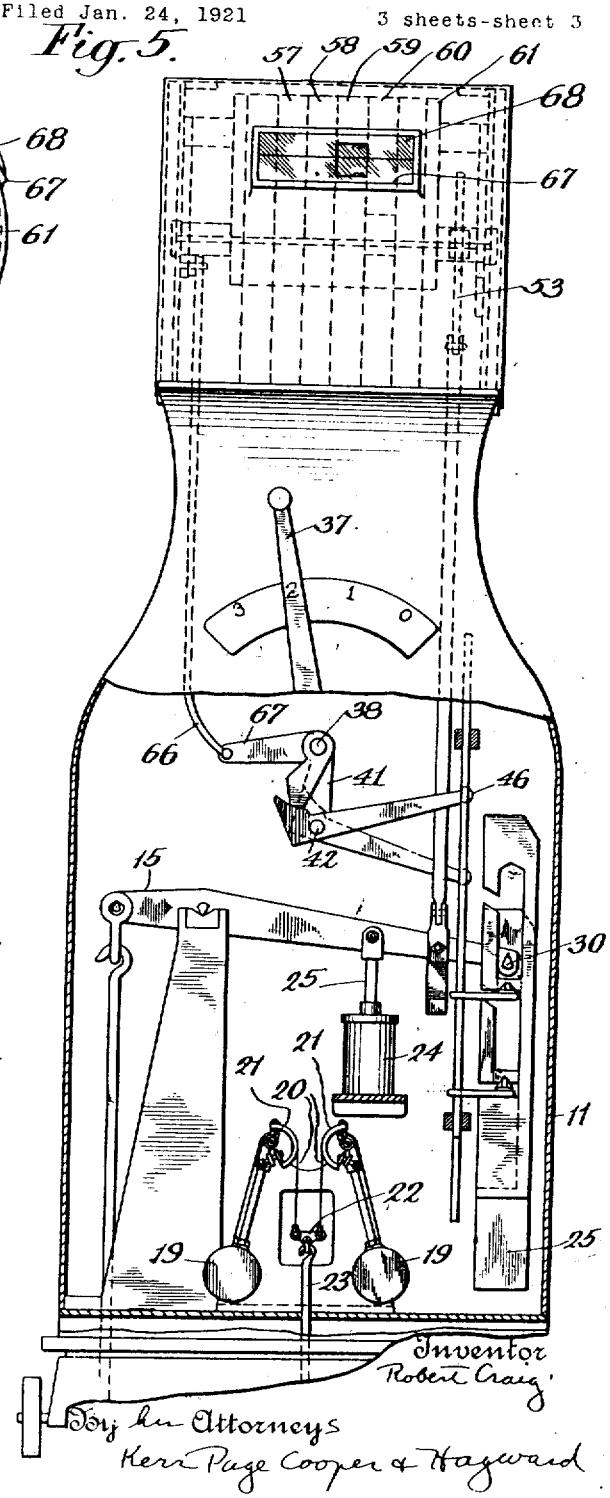
Fig. 5 is a view, similar to Fig. 1, of a modified form of the invention in which supplementary counterbalancing pendulums are employed.
Figure 7:
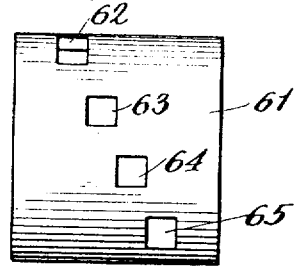
Fig. 7 shows a detail view of the shutter.
Figure 8:
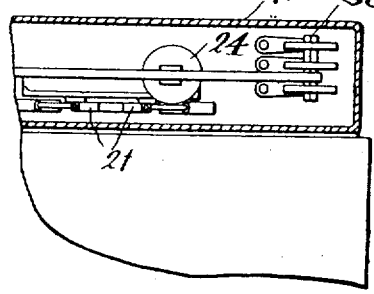
Fig. 8 is a horizontal part sectional view of the construction shown in Fig. 5. Certain parts are omitted for clearness.

In the modified form of the invention shown in Fig. 5, the single pendulum 18 depending from the beam is omitted and a plurality of pendulums 19 are employed. These pendulums are mounted in the housing 11 and are actuated by a pair of tapes 20 which pass over the compensating cams 21 and connect with an evener 22 which in turn is connected through a short steelyard 23 with a supplementary nose iron of the base lever system. This type of pendulum counterbalance construction is desirable in certain installations since minor changes in level of the scale do not cause an appreciable change in position of the scale beam. Any desired arrangement of automatic counterbalancing system may be employed as desired.

To check oscillations of the beam I provide the usual dash pot 24 which is supported in any desired manner and connected to the beam in any way as by a link.

Capacity weight applying devices.

When the capacity of the automatic counterbalancing means is exceeded by the applied load I provide means for applying capacity weights to the beam 15. These weights react and return the beam to a position which is within the range of the automatic counterbalance. In the embodiment illustrated three weights are employed. Each weight comprises a lower weighty portion 25 (Fig. 1), and an upwardly extending shank 26 having an integral L shaped portion 27 and a superimposed integral part 28 which is roughly the shape of an inverted L. The side of the shank 26 and the sides of portions 27 and 28 define the side walls of a slot 29 in which a knife edge 30 carried by the scale beam may move. The lower face of each portion 28 is notched as shown at 31 to form a V-shaped knife edge bearing. The knife edge carries a series of diamond pointed spacers or separators 32 (Fig. 4) which serve to separate the weights and prevent interference therebetween. These separators guide the weights into a position of support on the knife edge (see Fig. 4). The diagonal slot 33 between the ends of portions 27 and 28 serves to permit the removal of the weights and also acts to prevent accidental "throwing" of the weights.

For normal weighing operations the weights are all retained in upper position. In Figs. 1 and 5 one weight is shown in upper position and two weights (one being behind the other are shown in lower position).

To selectively elevate and lower the weights a series of shifter rods 34 are provided, one for each weight. Each rod is slidably journalled in the casing and carries a laterally projecting arm 35 which extends under the bottom of the L shaped portion 27 of its capacity weight. Each arm 35 carries a diamond pointed aligning edge 36 which fits a corresponding recess in the bottom of the L shaped portion 27. It will be understood that by selectively lowering one or more of the shifter rods the weight or weights will be deposited upon the beam and that they may be removed in part or entirely from the beam by operating one or more or all the shifter rods in reverse direction.

To so operate the shifter rods I provide a handle 37 which is fastened to a shaft 38 journalled in a suitable bracket. This shaft has rigidly fastened to it cams 39, 40 and 41.

Below shaft 38 is a second shaft 42 having freely rotatable thereon a number of finger arms 43, 44 and 45. These finger arms have portions thereof extending into cooperation with the cams heretofore mentioned and have rounded ends 46 which extend into slots in the shifter rods 34. By displacing the handle 37 clockwise the fingers 43, 44, 45 will be operated one at a time until the shifter rods are all elevated. Reverse movement lowers the rods in succession. To indicate the number of rods which are elevated and to retain the handle in set position, I provide a quadrant 47 with suitable markings thereon.

Weight indicating mechanisms.

In the drum housing is mounted a drum 50 which in general construction, except for its length, is similar to the drums used in counter scales. This drum is mounted upon a shaft 51 which is carried on the usual anti-friction bearings and provided with a driving pinion indicated at 52 and meshing with a rack 53 connected in any desired manner as by connection 54, knife edge 55 and counterweight 56 with the beam 15. By reason of the short length of drum I can utilize a single rack and drive the drum from one end.

The drum chart is provided with a plurality of series of columns of graduations indicated at 57, 58, 59 and 60. The number of columns will be dependent upon the number of capacity weights and the ultimate capacity of the scale. In the present embodiment if the ultimate capacity of the scale is 100 pounds the first column 57 would be graduated from zero to 25, the second column 25 pounds to 50 pounds; third column 50 pounds to 75 pounds and fourth column 75 to 100 pounds. I preferably do not graduate the entire chart but leave a short and uniform clear interval just before the zero of the first column and corresponding point of the adjacent columns.

The visibility of the columns is controlled by means of a pivoted shutter 61 which is provided with a number of staggered window openings, 62, 63, 64 and 65. The shutter is preferably counterbalanced and is interconnected with the capacity weight handle mechanism by a link 66 and a crank arm 67 carried by a shaft 38. The drum housing is provided with a suitable reading opening 67 which may have a magnifying glass 68 and the usual reading wire 69. This opening extends across all of the columns and may be located at any desired point in the periphery of the chart housing. For example, it may be on the front as shown in Figs. 1 and 2 or at an angle as shown in Figs. 5 and 6 or on top if desired. In portable scales this feature will permit the use of a short column and a low drum.

For normal weighing operations without capacity weights the window 62 will align with reading opening 67 and expose section 57 of the chart to view. If the load then exceeds the capacity of this section of the chart and of the automatic counterbalance the clear interval on the chart will appear at the window and the operator will be apprised that capacity weight or weights should be added. A capacity weight or a plurality of them are then applied by the manipulation of the handle 37. As soon as the clear space on the chart moves from under the indicating wire the operator will be apprised that sufficient capacity weights have been applied to bring the parts of the scale into position to be within the range of the automatic counterbalance. The manipulation of the handle 37 concurrently readjusts the position of the shutter so that the particular column of the chart is exposed which corresponds in initial value to the applied capacity weight or weights. After the drum comes to rest the weight indication is read and this reading is taken at a single point on the drum and will correspond to the total cumulative value of the applied capacity weights or weight and of the automatically counterbalanced load. If no capacity weights at all have been applied the reading will be taken from column 57 and will show directly the amount of the automatically counterbalanced load. All chart readings of columns which do not correspond with the total of the automatically counterbalanced and capacity weight counterbalanced loads will be obscured from view. Mental additions usually necessary with the capacity weight type of scale will be avoided thereby facilitating the taking of readings and minimizing the chance of errors.

If an excessive number of weights are applied the handle is moved in reverse direction to successively remove the number of weights necessary to bring the parts to a position to be within the range of the automatic counterbalance. Thereafter the reading is taken as before.

The construction above described permits the whole scale to be made extremely compact. For example, if the drum is made 8¼ inches in diameter, four times the diameter of the drum is available for graduations which would approximately correspond with a 34 inch dial upon a dial scale. Clear interval between graduations can be readily maintained within legal limits and ounce graduations may also be secured with weighing capacities not heretofore attained.

While I have described my invention with particular reference to the visual taking of a weight reading it will be understood that in its broader aspect the invention is not necessarily limited to visual reading. Furthermore the designations upon the displaceable member heretofore referred to as the drum indicator, need not necessarily be simple weight designations. The values may represent any factors based upon weight. Many varieties of scales are now in use which display amounts based upon weight and multiplied by another factor. My invention is equally applicable to such uses.

Certain generic claims readable upon the present disclosure, are being asserted in my copending application, Serial No. 386,453, filed on or about June 4, 1920.

What I claim is—

1. In a weighing scale, in combination, a scale beam, a load support connected thereto, an automatic counterbalancing means for the applied load, an indicating drum displaced in accordance with the displacement of the beam, capacity weight applying means, and means associated with said capacity weight applying means for obscuring certain sections of said drum and rendering other sections thereof visible whereby the total load as counterbalanced by the automatic counterbalancing means and by the applied capacity weights may be directly read from the said drum.

2. In a weighing scale of the automatically counterbalanced type having capacity weight devices, a scale beam, a rotatable indicating drum having a plurality of rows of weight graduations thereon, one row having a range corresponding to the automatically counterbalanced load, the other successive rows corresponding to said range increased by the total amounts of the applied capacity weights, and means for selectively rendering visible the row of graduations corresponding to the total number of capacity weights applied to the beam.

3. In a weighing scale of the automatically counterbalanced beam type, in which means are provided for increasing the capacity of the scale by the application of capacity weights to the beam, an indicating drum displaceable in accordance with the automatically counterbalanced load having a plurality of rows of weight graduations thereon, one of said rows having a weight range corresponding to the automatic counterbalancing capacity of the scale, the other rows corresponding in range to the total of the weight of the load automatically counterbalanced and of the weight of the load counterbalanced by the applied capacity weight or weights, and means operable by the capacity weight applying means for selectively rendering visible the row of graduations corresponding to the total applied capacity weights and for concurrently obscuring the other rows of graduations.

4. In a weighing scale, in combination with an automatically counterbalanced beam scale and capacity weight devices therefor to increase the amount of the applied load that may be counterbalanced by the scale, of an indicating member displaceable in accordance with the automatically counterbalanced load, of a chart carried by said member and having a plurality of rows of weight graduations, the first of said rows representing values of weight within the range of the automatically counterbalanced load, another of said rows representing values of weight as automatically counterbalanced, increased by the weight of the load counterbalanced by a capacity weight, and means for obscuring from view one or the other row on said chart in accordance with the application or non-application of the capacity weight.

5. In a weighing scale, in combination, a scale beam, an automatic counterbalance therefor, an indicator, displaceable in accordance with the displacement of the automatically counterbalanced beam, a plurality of rows of weight graduations of varying values, each row of graduations having the same total range of value, a shutter having a series of staggered window openings each corresponding with one of said rows, a capacity weight applying device having provisions for successively applying capacity weights to the scale beam, and means associated therewith and operated thereby for adjusting the shutter to a position to align a window with a particular row and expose the graduations of that row to view.

6. In a weighing scale, in combination, a scale beam, an automatic counterbalancing means for the applied load, a drum indicator displaceable in accordance with the applied automatically counterbalanced load, a capacity weight device including a setting handle and a plurality of capacity weights, means for successively and cumulatively applying said weights to the beam upon the displacement of said handle and for successively removing the same upon the reverse movement thereof, and means operated by said handle for changing the display of the weight indication by said drum to accord with the applied capacity weight or weights and to thereby indicate at a single point on the drum an accumulated reading of the entire applied load.

7. In a weighing scale, in combination, a scale beam, an automatic counterbalancing means for the applied load, a drum indicator displaceable in accordance with the applied automatically counterbalanced load, a capacity weight device including a setting handle and a plurality of capacity weights, means for successively and cumulatively applying said weights to the beam upon the displacement of said handle and for successively removing the same upon the reverse movement thereof, and means operated by said handle for changing the display of the weight indication by the drum to give at a single point thereon an accumulated weight reading of the amount of the load counterbalanced by the automatic counterbalance and the applied capacity weight or weights.

8. In a weighing scale having capacity weight devices and automatic load counterbalancing devices, an indicator displaceable in accordance with the automatically counterbalanced load and having a plurality of graduated indicating sections for different load ranges, a capacity weight device for offsetting certain portions of the applied load, and means controlled by said device for changing the display of the indication from section to section as the load range correspondingly changes.

9. In a weighing scale, in combination, a scale beam, an automatic counterbalance therefor, a capacity weight device, a displaceable weight-controlled indicator having multiple indications thereon, one corresponding to the automatically counterbalanced load and the others to said load supplemented by the amount offset by one or more of the capacity weights, and mean for correspondingly changing the display of the indications upon the operation of the capacity device whereby a single indication of the entire offset load is displayed.

10. In a weighing scale of the automatically counterbalanced type having capacity weight devices to increase the amount of the applied load that may be counterbalanced by the scale, of a member displaceable in accordance with the automatically counterbalanced load, a plurality of rows of designations representing factors of weight upon said member, one of said rows representing factors based upon the weight as automatically counterbalanced and within the range of the automatically counterbalanced load, another of said rows representing factors based upon the weight as automatically counterbalanced, increased by the weight of the load counterbalanced by a capacity weight, and means for cooperatively controlling the taking of readings from one or another of said rows of designations in accordance with the application or non-application of a capacity weight.

11. In a weighing scale, in combination with a load support, automatic counterbalancing means for the applied load, capacity weight applying means, a member displaceable in accordance with the automatically counterbalanced load from which readings may be taken, and means associated with the aforesaid capacity weight applying means for preventing the taking of readings from certain portions of said displaceable member and for permitting the taking of readings from other portions thereof.

In testimony whereof I hereto affix my signature.

ROBERT CRAIG.